United States Patent
Vagelos

(10) Patent No.: US 11,496,630 B2
(45) Date of Patent: *Nov. 8, 2022

(54) WIRELESS SERVICE CARD HAVING MACHINE READABLE CODES AND DEVICE AND PROCESS FOR USE THEREWITH

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,452

(22) Filed: Jan. 5, 2021

(65) Prior Publication Data

US 2021/0127016 A1    Apr. 29, 2021

Related U.S. Application Data

(63) Continuation of application No. 16/867,078, filed on May 5, 2020, now Pat. No. 10,887,472, which is a
(Continued)

(51) Int. Cl.
| | |
|---|---|
| *H04M 17/00* | (2006.01) |
| *G06K 7/10* | (2006.01) |
| *G06K 19/06* | (2006.01) |
| *H04W 4/50* | (2018.01) |
| *H04M 15/00* | (2006.01) |

(Continued)

(52) U.S. Cl.
CPC ...... *H04M 17/307* (2013.01); *G06K 7/10881* (2013.01); *G06K 19/06028* (2013.01); *H04M 15/48* (2013.01); *H04M 15/844* (2013.01); *H04M 15/846* (2013.01); *H04M 17/02* (2013.01); *H04M 17/023* (2013.01); *H04M 17/026* (2013.01); *H04M 17/103* (2013.01); *H04M 17/106* (2013.01); *H04M 17/20* (2013.01); *H04M 17/30* (2013.01); *H04M 17/301* (2013.01); *H04W 4/24* (2013.01); *H04W 4/50* (2018.02)

(58) Field of Classification Search
CPC ........ G06K 7/10881; G06K 19/06028; H04M 17/307; H04M 17/20; H04M 17/304; H04M 2017/2525; H04M 2017/2568; H04W 4/50
USPC ......................................... 235/375, 487, 494
See application file for complete search history.

(56) References Cited

U.S. PATENT DOCUMENTS

| | | | |
|---|---|---|---|
| 9,277,395 B2 * | 3/2016 | Aboulhosn | ........... H04W 8/205 |
| 2004/0152442 A1 * | 8/2004 | Taisto | .................. H04M 15/24 |
| | | | 455/406 |

(Continued)

*Primary Examiner* — Paultep Savusdiphol

(57) ABSTRACT

A process for authorizing wireless service includes providing a generally rectangular flat form factor card having a first surface and opposing second surface. The process further includes providing a machine-readable activation code arranged on the first surface, wherein the machine-readable activation code is configured to authorize the wireless service when provided to a system associated with a wireless service provider, receiving the machine-readable activation code in a server, the machine-readable activation code being captured by a wireless device, and provisioning the wireless service to the wireless device from a wireless network when the machine-readable activation code is provided to the system associated with the wireless network.

19 Claims, 6 Drawing Sheets

Related U.S. Application Data continuation of application No. 16/444,426, filed on Jun. 18, 2019, now Pat. No. 10,645,231, which is a continuation of application No. 14/964,034, filed on Dec. 9, 2015, now Pat. No. 10,326,891.

(51) Int. Cl.
*H04M 17/02* (2006.01)
*H04W 4/24* (2018.01)

(56) References Cited

U.S. PATENT DOCUMENTS

| | | | |
|---|---|---|---|
| 2005/0202850 A1* | 9/2005 | Kuty | H04M 17/00 455/565 |
| 2010/0130182 A1* | 5/2010 | Rosen | H04M 3/42357 455/414.1 |
| 2011/0065419 A1* | 3/2011 | Book | H04W 12/37 455/410 |
| 2012/0233004 A1* | 9/2012 | Bercaw | G06Q 20/20 705/17 |
| 2013/0138525 A1* | 5/2013 | Bercaw | G06Q 30/0601 705/26.1 |
| 2014/0106728 A1* | 4/2014 | Aboulhosn | H04W 88/04 455/418 |
| 2015/0026296 A1* | 1/2015 | Halpern | H04L 67/06 709/217 |

\* cited by examiner

WIRELESS SERVICE CARD HAVING MACHINE READABLE CODES AND DEVICE AND PROCESS FOR USE THEREWITH

CROSS-REFERENCE TO RELATED APPLICATIONS

This application is a continuation of U.S. patent application Ser. No. 16/867,078, filed May 5, 2020 now U.S. Pat. No. 10,887,472 issued Jan. 5, 2021, which is incorporated herein by reference in its entirety; which application is a continuation of U.S. patent application Ser. No. 16/444,426, filed Jun. 18, 2019 now U.S. Pat. No. 10,645,231 issued May 5, 2020, which is incorporated herein by reference in its entirety; which application is a continuation of U.S. patent application Ser. No. 14/964,034, filed Dec. 9, 2015 now U.S. Pat. No. 10,326,891 issued Jun. 18, 2019, which is incorporated herein by reference in its entirety.

BACKGROUND OF THE DISCLOSURE

1. Field of the Disclosure

The disclosure relates to an automated device and process for use in conjunction with a wireless service card for providing wireless services on wireless devices. More particularly, the disclosure relates to an automated device and process for use in conjunction with a wireless service card having a machine readable code for providing wireless services on wireless devices.

2. Related Art

A large number of wireless service plans exist for customers desiring wireless cellular services such as data, talk, and text messaging. Customers generally have the option of entering into a post-paid service (e.g., contract for a period of time) or a pre-paid, contract-free service. A Mobile Virtual Network Operator (MVNO) is a network operator that typically does not own its own frequency spectrum or have its own wireless network infrastructure. MVNOs negotiate and enter into business agreements with third party wireless carriers to purchase the right to use their networks for wireless services including a volume of data, number of minutes of airtime (voice calling), and number of text messages used.

MVNOs often utilize wireless service cards, also known as airtime cards or activation cards, for purchasing and/or adding wireless service, e.g. talk airtime, service days, data, or text messaging for a particular wireless device. Mobile network operators (MNOs) can use wireless service cards as well. Wireless service cards generally include a unique code that may include a scratch off coating obscuring the unique code that includes a long series of numbers and/or letters. The codes may typically be obscured to reduce fraudulent use thereof. The codes are correlated to a wireless service and are stored in a MVNO's database. Once a card is sold to a user, the user must manually scratch off the covering of the code and manually enter the code into the phone or in a computer linked to the MVNO's database to activate and/or provide the wireless service for a wireless device.

However, some wireless customers have a difficult time transcribing or manually entering the unique code from a wireless service card to activate or renew a wireless service plan. These customers include, but not limited to, seniors, people with Dyslexia (up to 20% of the population), people with Dyscalculia (between 3% and 6% of the population), and the 1 in 7 U.S. adults who cannot read. Moreover, transcribing or manually entering the unique code from a wireless service card to activate or renew a wireless service plan can be time consuming, bothersome and/or frustrating for others.

Accordingly, there is a need to simplify and automate the process by which customers utilize the unique code from a wireless service card to activate or renew a wireless service plan.

SUMMARY OF THE DISCLOSURE

The foregoing needs are met, to a great extent, by the disclosure, providing a device and associated methods for providing wireless services on wireless devices and/or systems by implementing a machine readable code with a wireless service card and/or utilizing a device that reads the machine readable code from a wireless service card. Thus, the disclosure improves a customer experience by using machine-readable wireless service cards. This makes it easier for customers who have a difficult time or cannot read numbers, reduces the time it takes to refill an account with associated wireless service, eliminates number entry errors, and the like.

In one aspect, a process for authorizing wireless service, the process includes providing a generally rectangular flat form factor card having a first surface and opposing second surface, providing a machine-readable activation code arranged on the first surface, wherein the machine-readable activation code is configured to authorize the wireless service when provided to a system associated with a wireless service provider, receiving the machine-readable activation code in a server, the machine-readable activation code being captured by a wireless device, and provisioning the wireless service to the wireless device from a wireless network when the machine-readable activation code is provided to the system associated with the wireless network.

In another aspect, a wireless device configured for authorizing wireless service includes a camera configured to capture a machine-readable activation code, wherein the machine-readable activation code is configured to authorize the wireless service when provided to a system associated with a wireless service provider, a processor further configured to store the machine-readable activation code captured by the camera in a memory, a transceiver configured to transmit the machine-readable activation code from the memory to a server, and the transceiver further configured to provide the wireless service from a wireless network when the machine-readable activation code is provided to the system associated with the wireless network.

In yet another aspect, a system for authorizing wireless service includes a server configured to store a plurality of machine-readable activation codes, wherein each one of the plurality of machine-readable activation codes is configured to authorize the wireless service associated with a wireless service provider, the server further configured to receive one of the plurality of machine-readable activation codes, one of the plurality of machine-readable activation codes being captured by a wireless device, the server further configured to authenticate one of the plurality of machine-readable activation codes, and the server further configured to provision the wireless service to the wireless device from a wireless network when one of the plurality of machine-readable activation codes is determined to be authentic for providing wireless service from the wireless network.

In a further aspect a system for funding an account includes a server configured to store a plurality of machine-readable activation codes, wherein each one of the plurality of machine-readable activation codes is configured to authorize funding associated with a provider, the server further configured to receive one of the plurality of machine-readable activation codes, one of the plurality of machine-readable activation codes being captured by a wireless device, the server further configured to authenticate one of the plurality of machine-readable activation codes, and the server further configured to provide funding when one of the plurality of machine-readable activation codes is determined to be authentic for providing funding.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

In this specification and claims it is to be understood that reference to a "wireless device" is intended to encompass any compatible computing device that can connect to a wireless communication network, such as mobile phones, personal computers, PDAs, hotspots, tablet computers, gaming systems, MP3 players, mobile equipment, mobile stations, cellular phones, smartphones, handsets, (e.g., Apple iPhone, Google Android, Microsoft Windows or Blackberry based devices, other types of PDAs or smartphones), wireless dongles, fall detection devices, security systems, devices implemented as Internet of things (IOT), other mobile computing devices and the like. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

A "point-of-sale" as used herein can refer to a location where one or more wireless devices and/or services can be sold and/or activated which may or may not require sales personnel. A point-of-sale can include, for example, a vending machine, an automated kiosk, a retailer store, a kiosk in a mall, a gas station, a convenience store, and the like. The point-of-sale can further include a web-based retailer.

Wireless devices may connect to a "wireless network" or "network" and are intended to encompass any type of wireless network to obtain or provide wireless phone services through the use of a wireless device, such as the Global System for Mobile Communication (GSM) network, Code-Division Multiple Access (CDMA) network, 4G Long-Term Evolution (LTE) network, 5G network (fifth-generation wireless network), a network associated with a communication channel as defined herein, or the like that may utilize the teachings of the disclosure to sell, activate, monitor, redeem, and/or track, the usage of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Figure 1:
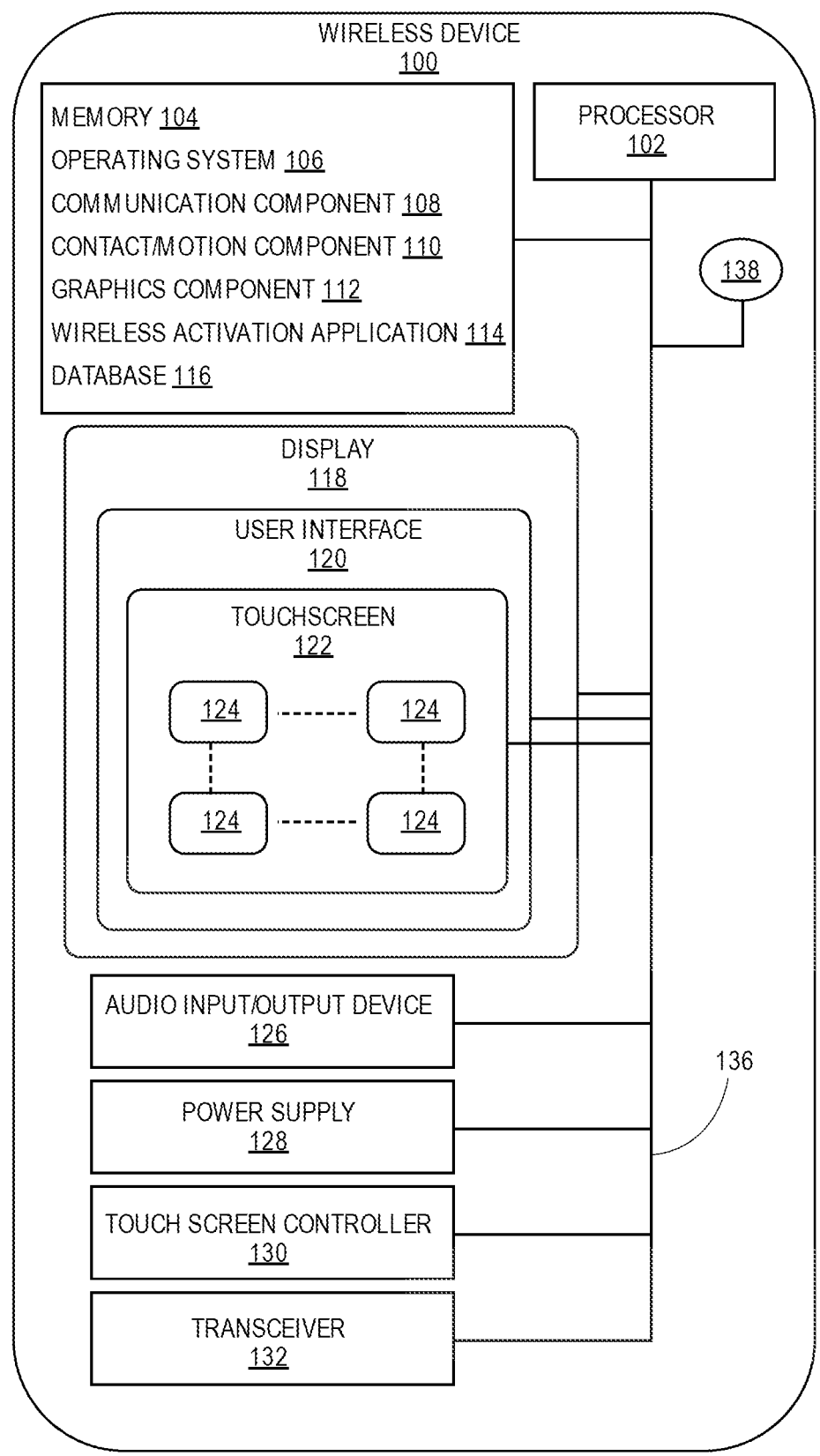
FIG. 1 illustrates a schematic of a wireless device with exemplary components in accordance with aspects of the disclosure.

FIG. 1 illustrates a schematic of a wireless device with exemplary components in accordance with aspects of the disclosure. A wireless device 100 may include a camera 138 that is multifunctional. The camera 138 may be used to capture images such as of a person or place, biometric readings such as a fingerprint or a retina, letters, symbols, and numbers (optical character reading), image of a bar code such as QR code, Data Matrix (DM) code, Universal Product Code (UPC), and the like. The camera 138 may be on the front, back, sides and the like of the wireless device 100.

In a particular aspect, the camera 138 may include functionality as a barcode reader or a QR code reader. A QR code (Quick Response Code) is a type of matrix barcode (or two-dimensional barcode). The barcode is a machine-readable optical label that contains information about the item to which it is attached. A QR code uses a number of standardized encoding modes including numeric, alphanumeric, byte/binary, and the like to efficiently store data. The QR code may include black modules arranged in a square grid on a white background, which can be read by the camera 138 or other imaging device and processed using Reed-Solomon error correction until the image can be appropriately interpreted. The required data may then be extracted from patterns that are present in both horizontal and vertical components of the image.

In a particular aspect, the camera 138 may include functionality as a Data Matrix code reader. A Data Matrix code is a two-dimensional matrix barcode including black and white "cells" or modules arranged in either a square or rectangular pattern. The Data Matrix code may be implemented with the ECC 200 version of Data Matrix and include Reed-Solomon codes for error and erasure recovery. Other protocols and/or versions of Data Matrix are contemplated as well.

In a particular aspect, the camera 138 may include functionality as a Universal Product Code (UPC) reader. The UPC is a barcode symbology utilizing protocols such as UPC-A, UPC-E, EAN, UPC-B, UPC-C UPC-D, UPC-2, UPC-5 and the like.

The camera 138 can be in communication with a processor 102, a memory 104, and a user interface 120. Moreover, the camera 138 may be in direct communication with an analog to digital converter. Accordingly, the camera 138 may capture the machine readable code, such as a bar code, QR code, or the like and generate an analog signal. The analog signal may be converted to a digital signal for processing by the processor 102. The processor 102 may be a central processing unit configured to execute instructions such as instructions related to software programs. Any processor such as a microprocessor, FPGA, an ASIC, a controller, and the like can be used in the wireless device 100 as understood to those of ordinary skill in the art.

The wireless device 100 may further include a display 118 that may be a liquid crystal display (LCD), LED (light emitting diodes), OLED, and the like. Preferably the LCD includes a backlight to illuminate the various color liquid crystals to provide a more colorful display. The graphical user interface 120 may be any type of physical input as readily employed in the field. For example, the graphical user interface 120 may have physical buttons having alphanumeric labels thereon that can be used to enter a sequence of numbers, letters, symbols, or a combination thereof. Alternatively, the graphical user interface 120 may be implemented on a touchscreen 122 having a motion sensor (not shown), and the like.

The memory 104 of the wireless device 100 may further include an operating system 106 (Windows, Apple IOS, Google Android, etc.), a communication component 108, a power supply 128 in the form of a battery, a contact/motion component 110, a graphics component 112, a wireless service application 114, a database 116, and the like. The operating system 106 together with the various components provides software functionality for each of the components of the wireless device 100. The memory 104 may include a high-speed, random-access memory. Also, the memory 104 may be a non-volatile memory, such as magnetic fixed disk storage, SIM, UICC, cloud-based memory, flash memory or the like. These various components may be connected through various communication lines including a data bus 136.

The wireless device 100 can include an audio input/output device 126. The audio input/output device 126 may include speakers, speaker outputs, and the like, providing sound output; and may include microphones, microphone inputs, and the like, for receiving sound inputs. In an exemplary aspect, the audio input/output device 126 may include an analog to digital converter and a digital to audio converter for audio input and output functions, respectively.

The wireless device 100 may include a transceiver 132 that provides radio and signal processing as needed to access a wireless network for services. The processor 102 may be configured to process call functions, data transfer, and the like and provide an array of services, based on those functions, to the user.

In an exemplary aspect, the touchscreen 122 of the disclosure may be implemented in the display 118 (entire or a portion thereof) or separate from the display, and may detect a presence and location of a touch of finger or hand of a user within the display area. The touchscreen 122 may also sense other passive objects, such as a stylus. The touchscreen 122 may be controlled by a touchscreen controller 130.

In one operation, the display 118 may show various objects 124 associated with applications for execution by the processor 102. For example, a user may touch the display 118, particularly the touchscreen 122, to interact with the objects 124. That is, touching an object 124 may execute an application stored in the memory 104 by the processor 102 and associated with the object 124. Additionally or alternatively, touching the object 124 may open a menu of options to be selected by the user. The display 118 may include one or more of a plurality of objects 124 for the user to interact with. Moreover, the display 118 may include a plurality of screens and show one or more screens at a time. The user may interact with the display 118 to move a screen into view on the display 118. Various objects 124 may be located in each of the screens.

The touchscreen 122 may be implemented as a resistive touchscreen, a surface acoustic wave touch screen, a capacitive touchscreen, self-capacitance sensors, infrared sensors, dispersive signal technology, acoustic pulse recognition, or the like. The display 118 is generally configured to display a graphical user interface (GUI) 120 that provides an easy to use visual interface between a user of the wireless device 100 and the operating system 106 or application(s) running on the wireless device 100. Generally, the GUI presents programs, files and operational options with graphical images. During operation, the user may select and activate various graphical images displayed on the display 118 in order to initiate functions and tasks associated therewith.

In another aspect of the disclosure, the memory 104 of the wireless device 100 can include the database 116 for storing user information and activation codes (valid and not used, currently used, previously used) or information. The user information may include full name, address, email address, contact number, credit card information, and the like. In one aspect, the database 116 may include security questions. In another aspect, the database 116 may include user specified preferences.

In yet another aspect of the application, the memory 104 of a wireless device 100 can include a wireless service application 114. The wireless service application 114 may be preinstalled or downloaded from an application store (Android Store, Blackberry Store, Windows Store or Apple iTunes and the like). The wireless service application 114 may be configured to control use of the wireless device 100 based on interaction with a wireless provider backend system 422 (shown in FIG. 5) and/or an activation code, such as a bar code, QR code or an alpha numeric code, for the activation or renewal of a wireless service. The wireless service application 114 may utilize an internal accounting module to establish an account with a representation of prepaid funds or available credit for wireless services. This accounting may also be implemented by one or more switches or systems associated with the wireless network. This accounting may also be implemented by one or more switches or systems associated with the wireless network and the internal accounting module.

In aspects using the internal accounting module, the wireless service application 114 may also be used to store and/or transmit a plurality of charge rates as well as a billing/payment algorithm. The internal accounting module can classify each wireless service (data, voice, SMS) into one of a plurality of billing categories; receive data correlated to an activation code (entered or captured by the camera, for example), select a charge rate corresponding to that billing category; calculate an appropriate charge for the data usage, voice usage, and SMS usage in real time by using the selected charge rate; and apply this appropriate charge to the account. For example, upon the retrieval and/or verification of a unique identifier of an activation code captured by the camera 138 or entered via the graphical user interface 120, the one or more steps may automatically take place to apply an appropriate charge or credit to the account.

In some aspects, once the internal accounting module determines that the amount of wireless service (data, voice, SMS) used has depleted the account to zero or a predetermined amount, the processor 102 may interact with the internal accounting module and/or the wireless provider backend system 422 to limit, prevent, alert the user, and/or control further use of the wireless device 100 as further described herein. The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service.

In some aspects where the wireless network provides an accounting of wireless service, once the network-based accounting system determines that the amount of wireless service (data, voice, SMS) used has depleted the account to zero or a predetermined amount, the wireless provider backend system 422 may limit, prevent, alert the user, and/or control further use of the wireless device 100 as described above.

The wireless service application 114 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from an activation code, the host processor may be capable of ascertaining the operating codes needed to activate that particular wireless device or to set its account amount.

Figure 2:
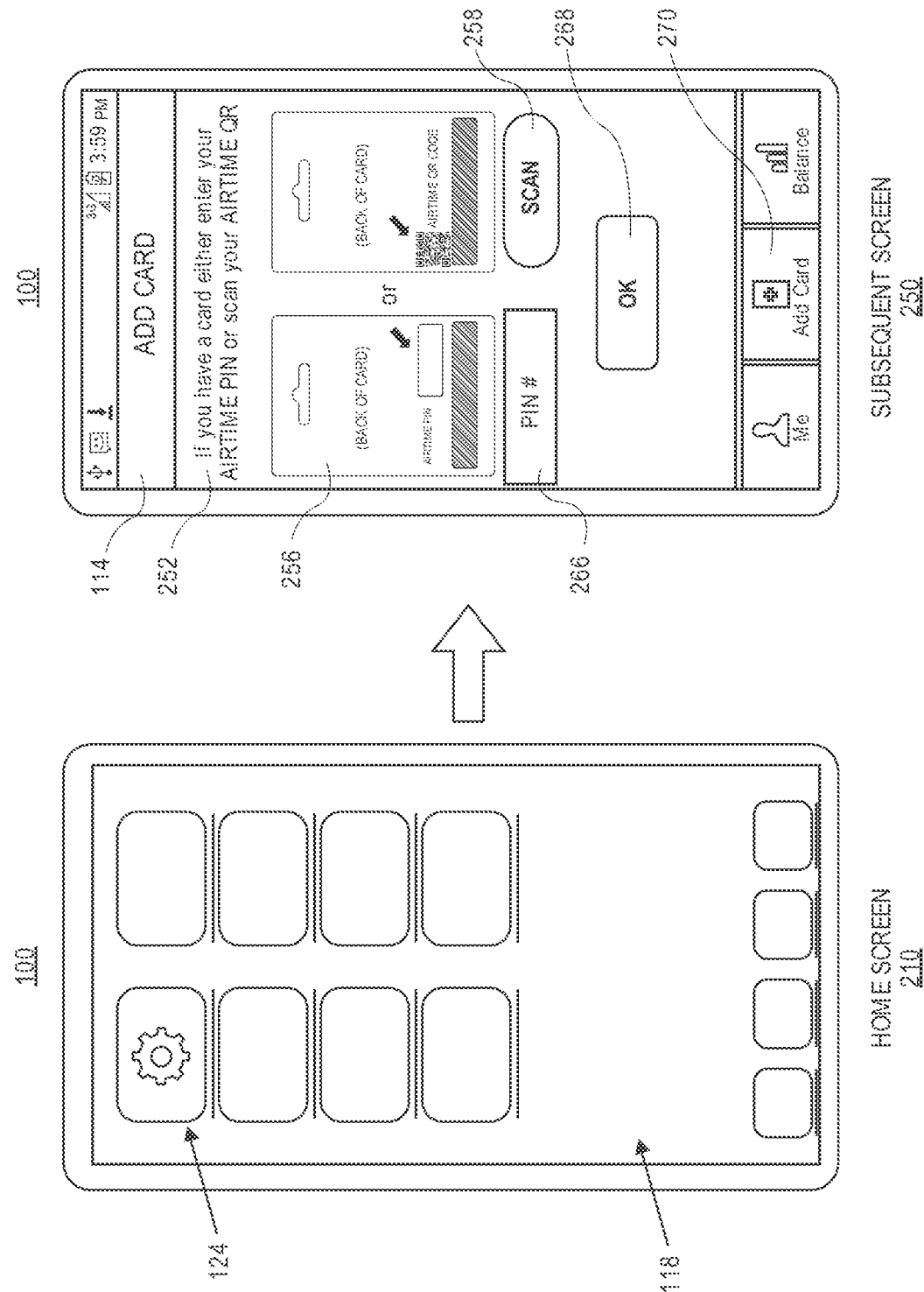
FIG. 2 illustrates an exemplary wireless device with a display of a home screen and a subsequent screen of a wireless service activation application with a graphical user interface in accordance with an aspect of the disclosure.

FIG. 2 illustrates an exemplary wireless device 100 with a display of a home screen 210 and a subsequent screen 250 of a wireless service application 114 with a graphical user interface, which may be used for the activation or renewal of wireless service in accordance with an aspect of the disclosure. The home screen 210 may include a plurality of icons, e.g. 124, which may include a calling icon, texting icon, internet icon, and the like, allowing a user to perform one or more functions on the wireless device 100. For example, the home screen 210 may also display icons for one or more applications that have been downloaded from the Internet, pre-installed, and/or unlocked/retrieved. The home screen 210 may also include payment and/or authentication applications and may include the wireless service application 114.

Some of the payment and/or authentication applications may be stored in a robust and/or encrypted manner that prevents a user from deleting, modifying, tampering, and the like, with the application's functionality. In this regard, the wireless service application 114, for example, can provide one or more wireless service card input options, as depicted in subsequent screen 250. The functionality of the wireless service application 114 is further described below in greater detail.

Figure 3:
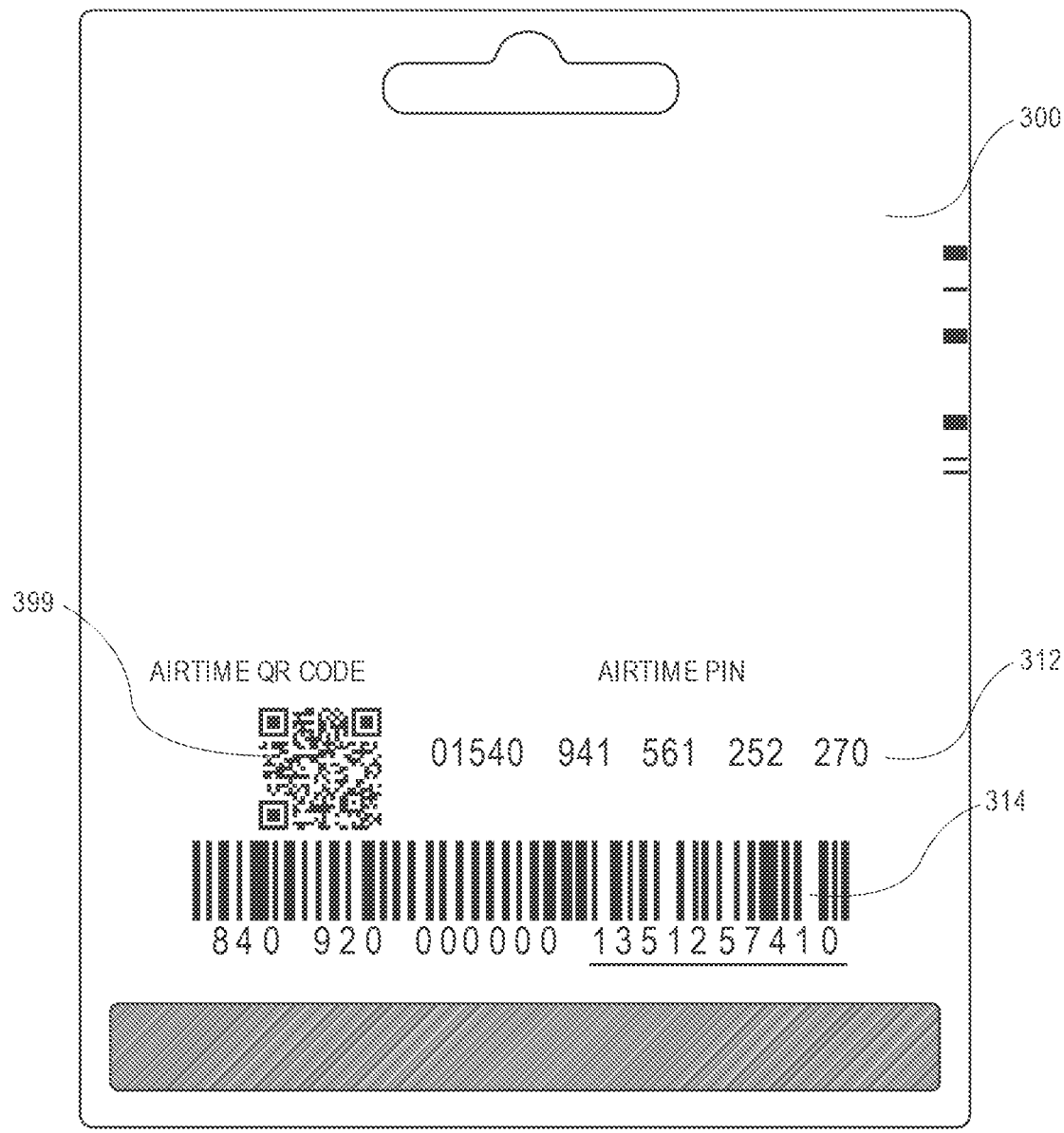
FIG. 3 illustrates a wireless service card having a machine-readable code in accordance with an aspect of the disclosure.

FIG. 3 illustrates a wireless service card having a machine-readable code in accordance with an aspect of the disclosure. FIG. 3 shows a wireless service card 300 used for adding wireless service for the wireless device 100. The wireless service card 300 may have a generally rectangular flat form factor card having a first surface and opposing second surface. In an aspect of the disclosure, the wireless service card 300 may include an activation code 312 included on the wireless service card 300 in order to activate one or more services for the wireless device 100. The activation code 312 may be located under a scratch-off panel (not shown) and can be manually entered into the wireless device 100 using the graphical user interface 120.

The wireless service card 300 may also include a machine-readable activation code 399 included on the wireless service card 300 in order to activate and/or add one or more services for the wireless device 100. The machine-readable activation code 399 may be located under a scratch-off panel (not shown) and captured as an image with the camera 138. In one aspect, the machine-readable activation code 399 may be a barcode. In another aspect, the machine-readable activation code 399 may be a QR code as shown in FIG. 3.

The activation code 312 and the machine-readable activation code 399 may be associated with a pre-paid predetermined amount of credit for one or more wireless services. A product code 314 may also be included on the wireless service card 300 so that the retail store or point of sale location can keep track of the wireless service card 300 as part of its inventory. Moreover, the product code 314 may be sent to a database associated with the MVNO by the retail store or point of sale location to indicate wireless services have been purchased in association with the product code 314. As should be understood, the machine-readable activation code 399, the activation code 312, the product code 314 and any other codes and the like can be a series of numbers, letters, symbols and a combination thereof, and/or may be in the form of a bar code. In particular, the machine-readable activation code 399 may use any current or future format, protocol, or the like to be machine-readable.

Turning back to FIG. 2, the wireless service application 114 may provide one or more wireless service card 300 input options as depicted in subsequent screen 250. When a wireless user is in possession of the wireless service card 300, the wireless user may launch the wireless service application 114. The wireless service application 114 may provide directions 252 stating, for example: "If you have a card either enter your airtime PIN or scan your airtime QR." Of course the directions 252 may include any wording guiding the wireless user or no wording at all.

In one aspect, the wireless service application 114 may provide images of a wireless card 254 showing a QR code and a wireless card 256 showing an alpha numeric code (PIN). The images are exemplary, any images consistent with the wireless service card 300 may be utilized. Moreover, the wireless service application 114 may provide no images.

The wireless service application 114 may provide a scan button 258 that enables the camera 138 to capture the machine-readable activation code 399 of the wireless service card 300. Of course, other implementations to enable the camera 138 to capture the machine-readable activation code 399 are contemplated as well. Once the user captures the machine-readable activation code 399 of the wireless service card 300, the wireless service application 114 may indicate successful capture. Thereafter, the wireless service application 114 may allow the wireless user to confirm use of the associated wireless service associated with machine-readable activation code 399 by pressing an "OK" button 268 or similar type of confirmation.

In another aspect, the wireless service application 114 may further provide an input box 266 to receive from the user a manually input alpha numeric code (PIN) from the wireless service card 300. Of course, other implementations to receive from the user a manually input alpha numeric code (PIN) from the wireless service card 300 are contemplated as well. Once the user inputs the activation code 312 of the wireless service card 300, the wireless service application 114 may indicate successful input. Thereafter, the wireless service application 114 may allow the wireless user to confirm use of the associated wireless service associated with the activation code 312 by pressing an "OK" button 268 or similar type of confirmation.

Figure 4:
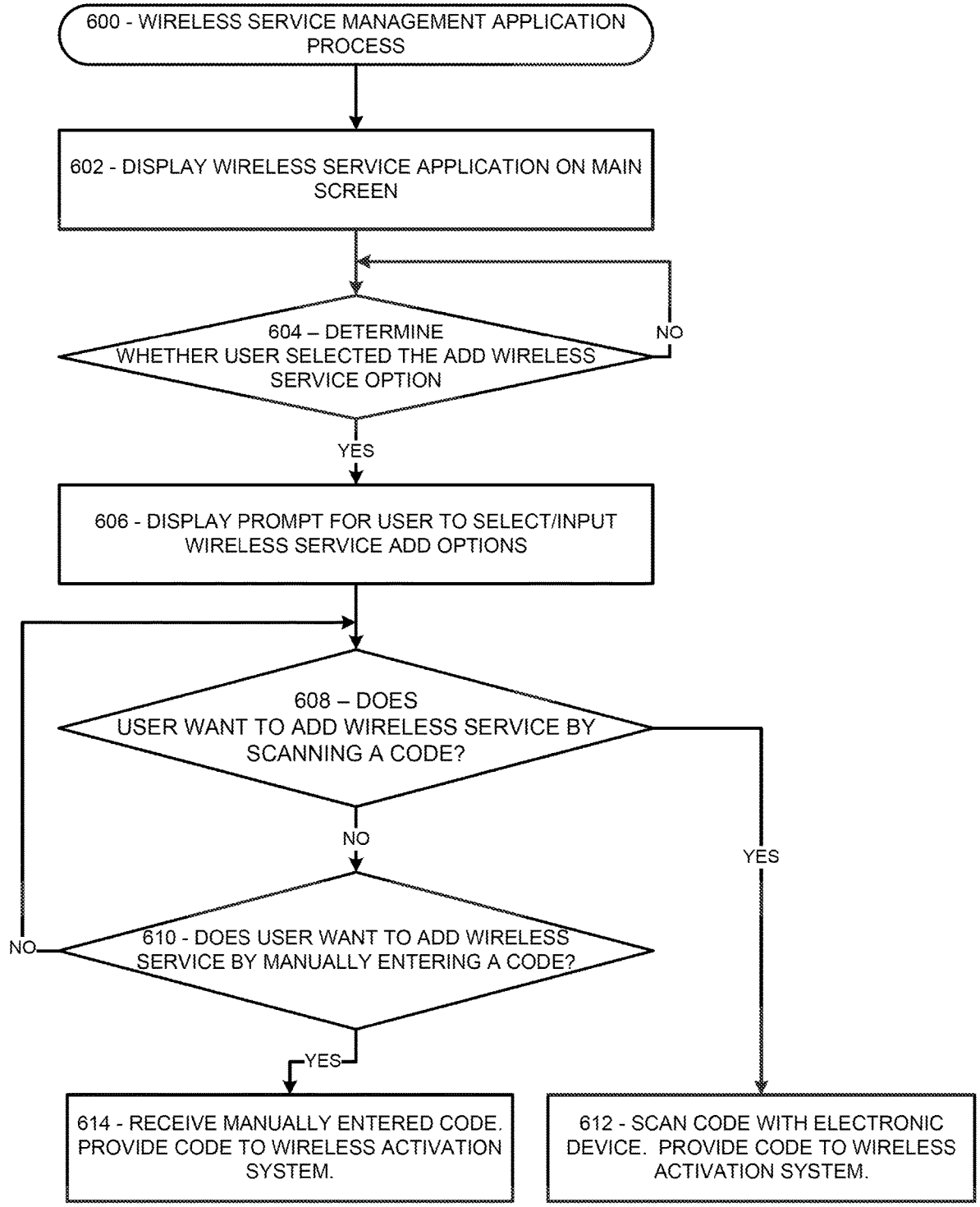
FIG. 4 illustrates exemplary method steps, which may be used to implement scanning a machine-readable code in accordance with aspects of the disclosure.

FIG. 4 illustrates an exemplary process, which may be used to implement scanning a machine-readable code in accordance with aspects of the disclosure. In particular, FIG. 4 illustrates a process 600 of the wireless service application 114. According to box 602, the wireless service application 114 may be displayed on the home screen 210 of the wireless device 100. After execution by the user, the wireless service application 114 may display the subsequent screen 250. In this regard, the home screen 210 may include a shortcut application for the wireless service application 114. Alternatively, the wireless service application 114 may be located under an applications tab or the like. In an exemplary aspect, the subsequent screen 250 directly follows the home screen 210 which displays the wireless service application 114.

Next, the process queries whether the user has selected to add wireless service in box 604. The user may access the add wireless service functionality automatically, by tapping the input field 270, or the like. If the application process concludes in the affirmative, respective fields are displayed as shown in 250 of FIG. 2 prompting the user to scan the machine-readable activation code 399 or input the activation code 312 as shown in box 606. On the other hand, if the process concludes in the negative, the process is returned to box 604.

As illustrated by box 608, the process 600 may determine that the user wants to add wireless service by scanning the machine-readable activation code 399. Thereafter, in box 612 the camera 138 may be enabled to capture the machine-readable activation code 399 of the wireless service card 300. As illustrated by box 610, the process 600 may determine that the user wants to add wireless service by inputting the activation code 312. Thereafter, in box 614 the wireless service application 114 may receive the activation code 312 of the wireless service card 300. Finally, each of the above-noted aspects may thereafter transmit the machine-readable activation code 399 or the activation code 312 to one or more of the MNO or MVNO as detailed below.

Figure 5:
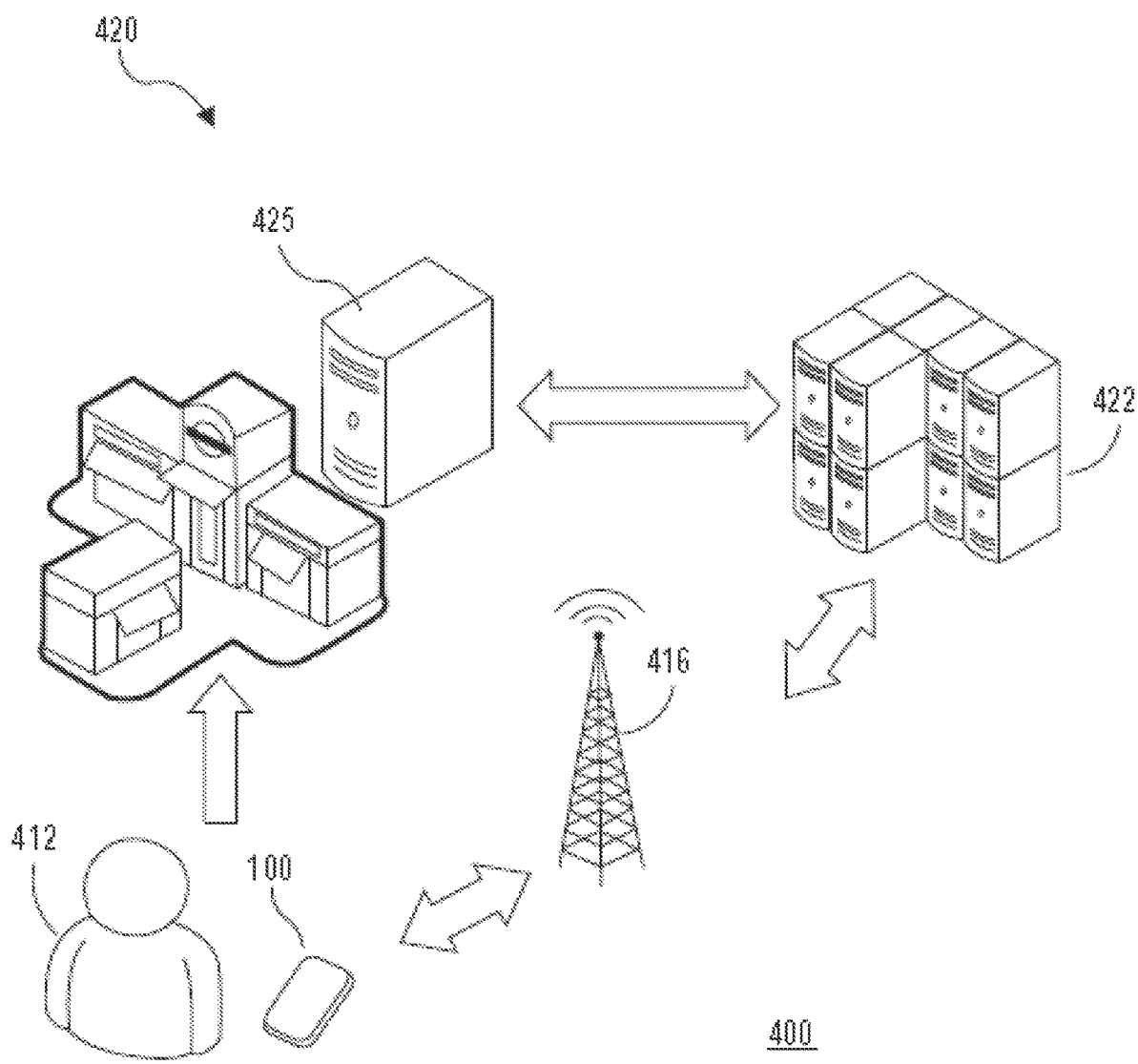
FIG. 5 illustrates a schematic diagram of an exemplary wireless service activation system in accordance with aspects of the disclosure.

Referring now to FIG. 5, a schematic diagram of an exemplary wireless service system according to aspects of the disclosure is depicted. In particular, the wireless service system 400 can be used to activate, provision, and/or provide wireless network service(s) on the wireless device 100 implementing various aspects of the wireless service card 300, using the activation code 312 and/or the machine-readable activation code 399. Unlike conventional activation processes for wireless devices that can require a user 412 to contact a live customer service representative, utilize an interactive voice response system from a landline or another wireless device, or access an Internet website by the user 412 to use a website activation system, the present wireless service system 400 may be used to activate a wireless device 100 and/or activate services with automated code/information gathering and without requiring access to an agent, or a website.

According to aspects of the disclosure, the activated service(s) may include, for example, activation of a wireless service after or during the initial activation of the wireless device 100 by a user 412. The initial activation of the wireless device 100 may be described herein as "out of the box" activation and may take place at the point-of-sale 420. In some additional aspects, the services requested to be activated and authorized are one or combinations of: airtime, text messaging, and data plans, but may also include at least one of device upgrades, device reactivations, wireless number changes, and wireless number porting for wireless devices that have previously been activated.

According to some aspects of the disclosure, the point-of-sale 420 can include, for example, a store retailer, a vending machine, a kiosk, a web-based retailer, and the like. In an aspect of the disclosure, the wireless service card 300, may both include the activation code 312 and the machine-readable activation code 399. When the user is ready to use the wireless service card 300, he can simply enter the activation code 312 or capture the machine-readable activation code 399 into the wireless device 100 using the graphical user interface 120. Then through the graphical user interface 120 or touchscreen 122, the user 412 can activate the wireless device 100 using the wireless service application 114. In one aspect, the wireless service application 114 communicates with the wireless provider backend system 422 through a cell tower 416. Then the wireless provider backend system 422 authenticates and authorizes the predetermined amount of talk time, text, or data or a combination thereof based on the activation code 312 or the machine-readable activation code 399. The wireless provider backend system 422 may be implemented with a server.

The point-of-sale 420 may also include a communication system 425 that can be used for payment and/or executing security and activation protocols. The communication system 425 may also be configured to be in communication with a wireless provider backend system 422.

Figure 6:
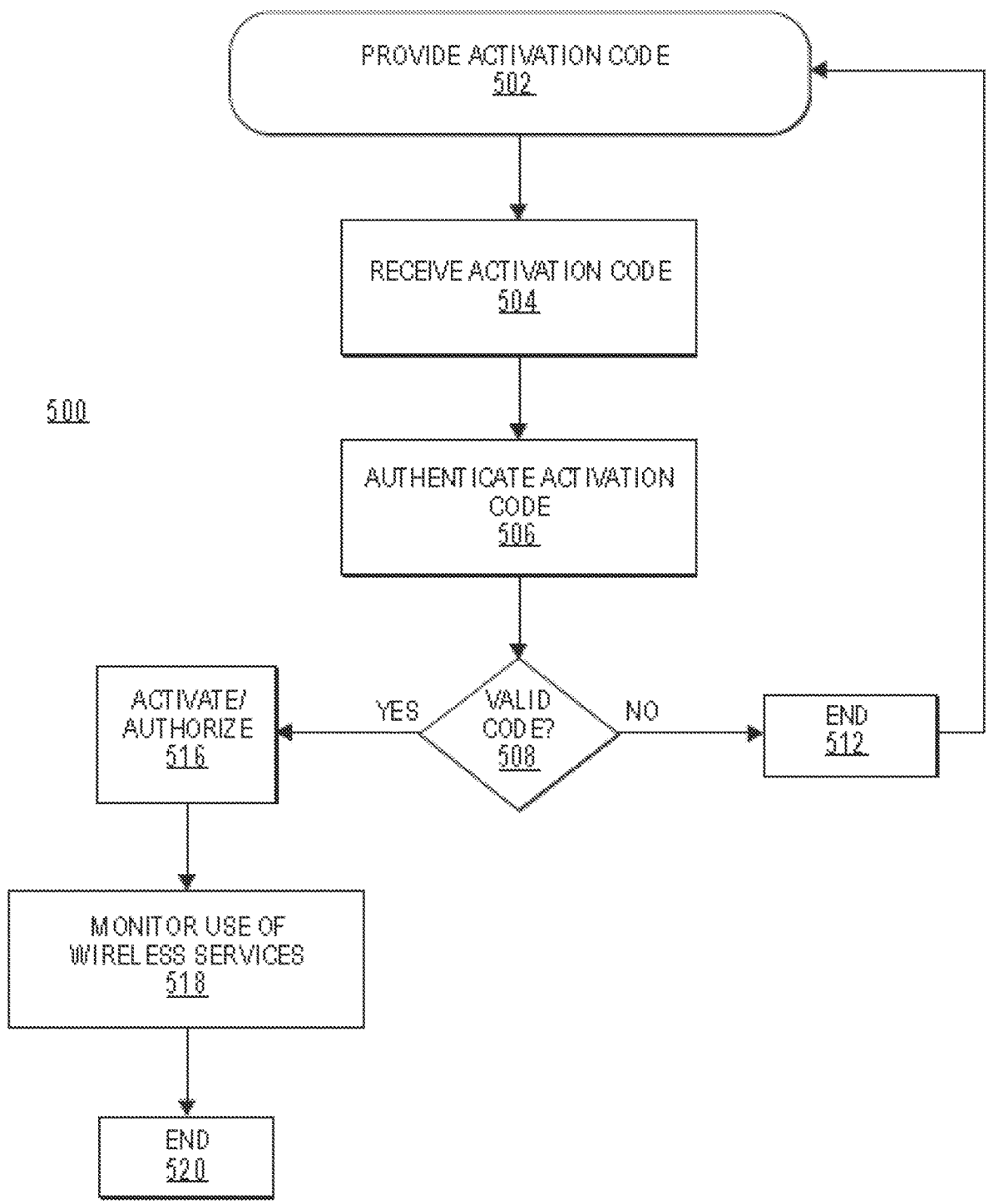
FIG. 6 illustrates exemplary method steps, which may be used to implement the system of the disclosure.

Referring now to FIG. 6, an exemplary method that may be used to implement systems of the disclosure, are depicted in a flowchart 500. In particular, the method includes ways in which a user can provide an activation code 312 or the machine-readable activation code 399 located with the wireless service card 300, to add and/or activate one or more wireless service(s) on the wireless device 100. At box 502, the user provides an activation code 312 in the form of a code (letters, numbers, symbols or combination thereof) manually entered using the graphical user interface 120 or the machine-readable activation code 399 that was captured by the camera 138. The activation code 312 or the machine-readable activation code 399 may include a programmed identifier that can correspond to a wireless provider selection and one or more wireless services to be activated. It is contemplated that additional codes may be included for additional services and amounts, security codes, as well as for production data for statistical analysis performed by the wireless provider, as it may be desired. Each of the codes may be a series of digits including letters, symbols, and/or numbers.

At box 504, the activation code 312 or the machine-readable activation code 399 can be received by the wireless device 100. If received by the wireless device 100, then the wireless device 100 can transmit the activation code to the cell tower 416, which then relays the code to the wireless provider backend system 422 for authentication.

At box 508, the activation code 312 or the machine-readable activation code 399 along with the wireless device 100 information may be received by the wireless provider backend system 422 where it can verify the authentication code by searching in one or more databases 506. Alternatively, the database can be preloaded on the wireless device 100 and the activation code 312 or the machine-readable activation code 399 is authenticated by the wireless device 100 through the wireless service activation application. If the activation code 312 or the machine-readable activation code 399 is not valid, the activation of the wireless service will be stopped at box 512. Upon stopping the activation of the wireless service as shown in box 512, the wireless provider backend system 422 may send a warning message to the user 412 (e.g., using the wireless device 100) and/or the wireless provider and proceed back to box 502 and wait for the valid authentication code to be provided. If the activation code 312 or the machine-readable activation code 399 is valid (authentic, not been previously used, or the like), authorization of a wireless service may take place at box 516. At box 518, the use of the activated wireless service may be monitored to determine when the activated wireless service has been depleted by the user 412. At box 520 the process ends.

It should be noted that aspects of the disclosure may also be implemented in a web-based transaction. In this regard, a user may purchase an activation code 312 and/or a machine-readable activation code 399 in order to activate and/or add one or more services for the wireless device 100 during a web-based transaction. Once the transaction is completed, the user can obtain a screen activation code 312 and/or a screen machine-readable activation code 399. Thereafter, the user can use the activation code 312 and/or the machine-readable activation code 399 as noted above. Alternatively, once the transaction is completed, the user can scan the machine-readable activation code 399 directly from the display device, such as a PC, laptop, etc., where the transaction was completed with the wireless device 100.

In an alternative aspect, the wireless service card 300 may be implemented as a gift card, a monetary value card, or the like provided by one or more entities including a MNO, a MVNO, the Android Store, the Blackberry Store, the Windows Store, the Amazon Store, Apple iTunes, eCards, ApplePay, Samsung Pay, Android Pay, and the like. Accordingly, a machine-readable activation code 399 may be associated with a pre-paid predetermined amount of credit for one of these entities. In this alternative aspect, the wireless service application 114 may be implemented as a funding application to fund the account for one of the above-noted entities. The fund application may be configured to provide funding based on interaction with a backend system that is implemented in a manner similar to the wireless provider backend system 422 (shown in FIG. 5) and/or an activation code, such as a bar code, QR code or an alpha numeric code, for providing funding to one of the above noted that these.

In this alternative aspect, the process similar to the process 600 may determine that the user wants to fund an account by scanning the machine-readable activation code. Thereafter, the camera 138 may be enabled to capture the machine-readable activation code of the card. Thereafter, the application may receive the activation code of the card. Finally, each of the above-noted aspects may thereafter transmit the machine-readable activation code to a backend system of one of the entities noted above.

Accordingly, the disclosure provides a device and associated methods for providing wireless services on wireless devices by implementing a machine readable code with a wireless service card and/or utilizing a device that reads the machine readable code from a wireless service card. Additionally, the disclosure provides a device and associated methods for providing funds for an entity by implementing a machine readable code with a card and/or utilizing a device that reads the machine readable code from a card. Thus, the disclosure improves a customer experience by using machine-readable wireless service cards. This makes it easier for customers who have a difficult time or cannot read numbers, reduces the time it takes to refill an account, eliminates number entry errors, and the like.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092 and those defined by the NFC Forum.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A process comprising:
providing an application executable on a wireless device, the application being configured to control the wireless device to obtain an activation code, the activation code being configured to authorize wireless service, wherein the activation code is configured to represent a prepaid amount of the wireless service;
receiving the activation code along with information identifying the wireless device;
provisioning the prepaid amount to the wireless device from a wireless network based on provision of the information and the activation code to a wireless service provider system associated with the wireless network;
determining an amount of the prepaid amount used by the wireless device with an accounting device; and
controlling a use of the wireless service based on the determined amount.

2. The process of claim 1, wherein the activation code comprises a QR code, bar code, data matrix (DM) code, or universal product code (UPC), wherein the code is arranged on a card with a scratch off panel arranged thereover.

3. The process of claim 1, wherein the wireless service includes at least one of the following: wireless data, text messaging, or wireless talk time.

4. The process of claim 1, wherein:
the wireless service provider system is implemented at least in part by the wireless device;
the accounting device comprises an internal accounting device implemented by the wireless device; and
the process further comprises:
monitoring a use of the wireless service provided by the wireless service provider system used by the wireless device with the internal accounting device implemented by the wireless device; and
controlling the use of the wireless service provided by the wireless service provider system used by the wireless device in response to the internal accounting device implemented by the wireless device.

5. The process of claim 4, further comprising:
generating a graphical user interface on a display of the wireless device in response to execution of the application, the graphical user interface comprising an input to initiate capturing the activation code in response to a user's initiation.

6. The process of claim 4, wherein:
the activation code comprises a QR code;
the QR code is arranged on a card with a scratch off panel arranged thereover; and
the wireless service includes at least one of the following: wireless data, text messaging, or wireless talk time.

7. The process of claim 1, wherein:
the wireless service provider system is implemented at least in part by a wireless provider backend system;
the accounting device is implemented at least in part by the wireless provider backend system; and
the process further comprises:
  transmitting in response to the application the activation code along with the information over a network to the wireless service provider system;
  monitoring a use of the wireless service provided by the wireless service provider system used by the wireless device with the wireless provider backend system; and
  controlling the use of the wireless service provided by the wireless service provider system used by the wireless device with the wireless provider backend system.

8. The process of claim 7, further comprising:
generating a graphical user interface on a display of the wireless device in response to execution of the application, the graphical user interface comprising an input to initiate capturing the activation code in response to a user's initiation.

9. The process of claim 7, wherein:
the activation code comprises a QR code;
the QR code is arranged on a card with a scratch off panel arranged thereover; and
the wireless service includes at least one of the following: wireless data, text messaging, or wireless talk time.

10. A wireless device, comprising:
a camera configured to capture an activation code, wherein the activation code is configured to authorize a wireless service, wherein the activation code is configured to represent a prepaid amount of the wireless service;
a processor configured to execute an application, the application being executable by the processor and configured to perform the capture;
the processor further configured to receive the activation code along with information identifying the wireless device;
the processor further configured to provide the prepaid amount from a wireless network based on provision of the information and the activation code to a wireless service provider system associated with the wireless network,
wherein an amount of the prepaid amount is determined to be used by the wireless device with an accounting device, and
wherein a use of the wireless service is controlled based on the determined amount.

11. The wireless device of claim 10, wherein:
the wireless service provider system is implemented at least in part by the wireless device;
the wireless service provider system is configured to monitor the use of the wireless service provided by the wireless service provider system used by the wireless device; and
the wireless service provider system is configured to control the use of the wireless service.

12. The wireless device of claim 11, wherein:
the activation code comprises a QR code;
wherein the QR code is arranged on a card with a scratch off panel arranged thereover; and
the wireless service includes at least one of the following: wireless data, text messaging, or wireless talk time.

13. The wireless device of claim 11, wherein the application is further configured to generate a graphical user interface in response to execution of the application, the graphical user interface comprising an input to initiate capturing the machine-readable wireless service activation code.

14. The wireless device of claim 10, further comprising:
a transceiver configured to transmit the activation code from the memory along with the information over a network to the wireless service provider system,
wherein the wireless service provider system is implemented at least in part by a wireless provider backend system;
wherein the wireless service provider system is configured to monitor a use of the wireless service provided by the wireless service provider system used by the wireless device; and
wherein the wireless service provider system is configured to control the use of the wireless service provided by the wireless service provider system used by the wireless device.

15. The wireless device of claim 14, wherein:
the activation code comprises a QR code;
the QR code is arranged on a card with a scratch off panel arranged thereover; and
the wireless service includes at least one of the following: wireless data, text messaging, or wireless talk time.

16. The wireless device of claim 14, wherein the application is further configured to generate a graphical user interface in response to execution of the application, the graphical user interface comprising an input to initiate capturing the activation code.

17. The wireless device of claim 14, wherein the wireless service provider system is further configured to control the use of the wireless service.

18. The wireless device of claim 10, wherein:
the activation code comprises a QR code; and
the QR code is arranged on a card with a scratch off panel arranged thereover.

19. The wireless device of claim 10, wherein the wireless service includes at least one of the following: wireless data, text messaging, or wireless talk time.

* * * * *